No. 850,533. PATENTED APR. 16, 1907.
T. F. LITAKER.
EARTH AUGER.
APPLICATION FILED MAY 29, 1906.
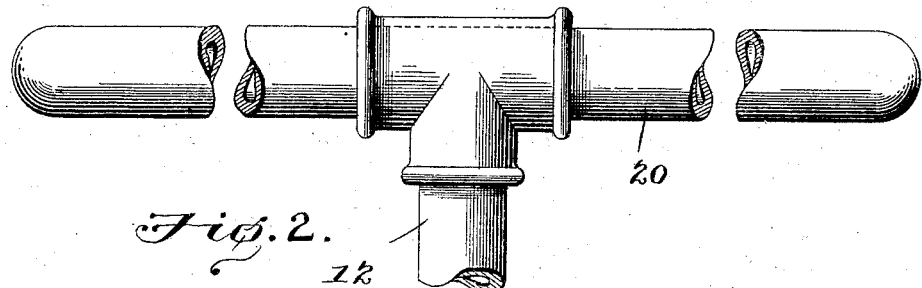
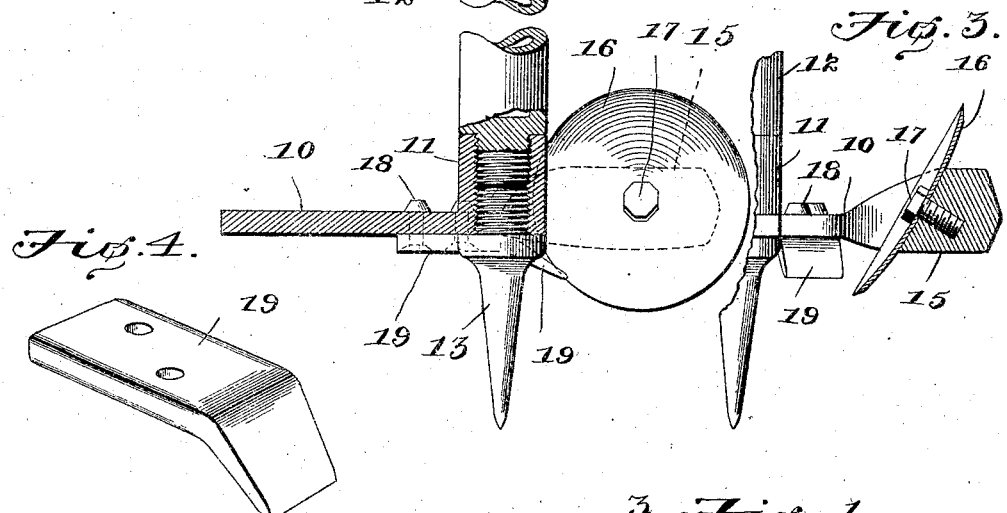
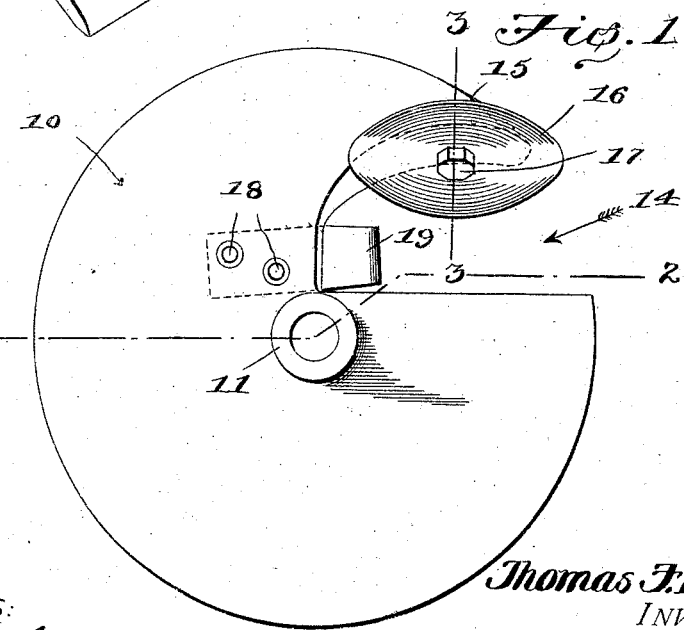
Thomas F. Litaker,
INVENTOR
By C. A. Snow & Co
ATTORNEYS
WITNESSES:

UNITED STATES PATENT OFFICE.

THOMAS FRANK LITAKER, OF CONCORD, NORTH CAROLINA.

EARTH-AUGER.

No. 850,533.   Specification of Letters Patent.   Patented April 16, 1907.

Application filed May 29, 1906. Serial No. 319,376.

*To all whom it may concern:*

Be it known that I, THOMAS FRANK LITAKER, a citizen of the United States, residing at Concord, in the county of Cabarrus and State of North Carolina, have invented a new and useful Earth-Auger, of which the following is a specification.

This invention relates to earth-augers, and has for its object to improve the construction and increase the efficiency of devices of this character.

With these and other objects in view, which will appear as the nature of the invention is better understood, the invention consists in certain novel features of construction, as hereafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a plan view of the body of the improved device. Fig. 2 is a side elevation, with the body in section, on the line 2 2 of Fig. 1. Fig. 3 is a detail view in section on the line 3 3 of Fig. 1. Fig. 4 is a perspective view, enlarged, of the stationary cutter.

The improved device comprises a body 10, preferably in the form of a circular disk and with a threaded central hub 11, into one side of which the operating-stem 12 is inserted and into the other side of which an earth-penetrating or centering stud or point 13 is inserted, as shown. Formed in the body 10 at one side is a recess 14, with the body 10 thickened at the outer side of the recess, as at 15, and with its inner face extending at an angle to the radius of the body 10. The inner face of the thickened portion 15 is also inclined to the plane of the body, and forms a base upon which a cutting-disk 16 is pivoted, as by a cap-screw 17, the disk being preferably concaved and large enough to extend slightly beyond the body 10. Rigidly attached, as by rivets 18, beneath the body 10 at the inner end of the recess 14 is a cutter-blade 19, with the operating end inclined to the plane of the body and extending into the area of the recess 14. The stem 12 is preferably tubular and with a transverse handle 20 at the upper end.

By this arrangement if the stud 13 be forced into the ground and the body 10 and its attachments rotated by the handle 20 and stem 12 the cutter 19 and doubly-inclined cutting-disk 16 will force their way into the ground and sever the earth and cause it to pass upwardly through the recess 14 and be disposed upon the body 10, and thus bore a circular hole equal in diameter to the outer edge of the disk 16.

The disk being doubly inclined rotates upon its stud 17 with the motion of the body 10, accelerates the action, and materially reduces the resistance, and thus increases the efficiency of the device.

The implement is strong and durable, may be inexpensively manufactured, and operates effectually for the purposes described.

Having thus described the invention, what is claimed is—

1. In an earth-auger, a body having an operating-stem, a cutter extending at an angle to the radius of the body, and a cutting-disk mounted for rotation transversely of the cutter.

2. In an earth-auger, a body having an aperture extending thereinto from the periphery thereof and an operating-stem, a cutting-disk mounted for rotation in said aperture, and a cutting-blade between said disk and stem.

3. In an earth-auger, a body having an operating-stem, a cutter detachably connected to said body and extending at an angle to the radius of the same, a cutting-disk, and means for detachably connecting said disk to said body for rotation at an angle to the cutter.

4. In an earth-auger, a body having an aperture projecting thereinto from its periphery and an operating-stem, a cutting-disk, means for detachably connecting said disk to said body for rotation in said aperture, and a cutter depending from said body and connected thereto between the disk and the center of the body.

5. In an earth-auger a body having an operating-stem, and a cutting-disk mounted for rotation upon the body at an incline to the plane thereof and at an angle to the radius of the body.

6. In an earth-auger a body having an operating-stem, a cutting-disk mounted for rotation upon the body and inclined to the plane thereof and at an angle to the radius of said body, and a stationary cutter attached to the body and depending therefrom.

7. In an earth-auger, a body having an operating-stem and provided with a recess, and a cutting-disk mounted for rotation upon one of the walls of said recess and inclined to the plane of the body.

8. In an earth-auger, a body having an operating-stem and provided with a recess, a cutting-disk mounted for rotation upon one of the walls of said recess and inclined to the plane of the body, and a stationary cutter depending from said body.

9. In an earth-auger, a body having an earth-penetrating stud and with an operating-stem and provided with a recess having one wall at an angle to the radius of the body, and a cutting-disk mounted for rotation upon said wall and disposed at an angle to the plane of the body.

10. In an earth-auger, a body having an earth-penetrating stud and with an operating-stem and provided with a recess having one wall at an angle to the radius of the body, a cutting-disk mounted for rotation upon said wall and disposed at an angle to the plane of the body, and a stationary cutter depending from said body.

11. In an earth-auger, a body having a recess, one wall of which is at an angle to the radius of the body and with a threaded aperture, a threaded stem, and a threaded earth-penetrating stud detachably engaging said threaded aperture from opposite sides of the body, and a cutting-disk mounted for rotation upon said wall of the recess and at an angle to the plane of the plate.

12. In an earth-auger, a body having a recess, one wall of which is at an angle to the radius of the body and with a threaded aperture, a threaded stem, and a threaded earth-penetrating stud detachably engaging said threaded aperture from opposite sides of the body, a cutting-disk mounted for rotation upon said wall of the recess and at an angle to the plane of the plate, and a stationary cutter depending from said body.

In testimony that I claim the foregoing as my own I have hereto affixed my signature in the presence of two witnesses.

THOMAS FRANK LITAKER.

Witnesses:
GILES THEODORE CROWELL,
WILLIAM ANDREW WILKINSON.